(12) United States Patent
Shrivastava et al.

(10) Patent No.: US 10,296,312 B2
(45) Date of Patent: May 21, 2019

(54) METHODS, APPARATUSES, AND SYSTEMS FOR ZERO SILENT DATA CORRUPTION (ZDC) COMPILER TECHNIQUE

(71) Applicants: Aviral Shrivastava, Phoenix, AZ (US); Moslem Didehban, Tempe, AZ (US)

(72) Inventors: Aviral Shrivastava, Phoenix, AZ (US); Moslem Didehban, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/597,926

(22) Filed: May 17, 2017

(65) Prior Publication Data

US 2017/0337047 A1 Nov. 23, 2017

Related U.S. Application Data

(60) Provisional application No. 62/339,389, filed on May 20, 2016.

(51) Int. Cl.
*G06F 8/41* (2018.01)
*G06F 11/36* (2006.01)
*G06F 9/30* (2018.01)
*G06F 9/38* (2018.01)

(52) U.S. Cl.
CPC .......... *G06F 8/433* (2013.01); *G06F 9/3005* (2013.01); *G06F 9/3017* (2013.01); *G06F 9/30021* (2013.01); *G06F 9/30043* (2013.01); *G06F 9/30076* (2013.01); *G06F 9/30116* (2013.01); *G06F 9/30145* (2013.01); *G06F 9/3861* (2013.01); *G06F 9/3869* (2013.01); *G06F 11/3624* (2013.01)

(58) Field of Classification Search
None
See application file for complete search history.

(56) References Cited

U.S. PATENT DOCUMENTS

| 7,134,047 | B2 * | 11/2006 | Quach | G06F 11/1641 714/11 |
| 2002/0116662 | A1 * | 8/2002 | Hofstee | G06F 9/30116 714/25 |
| 2002/0199175 | A1 * | 12/2002 | Saulsbury | G06F 11/1492 717/141 |

OTHER PUBLICATIONS

Chielle, "Selective Software-Implemented Hardware Fault Tolerance Techniques to Detect Soft Errors in Processors with Reduced Overhead", Apr. 2016, Published by: Universidade Federal Do Rio Grande Do Sul.*
Reis, "SWIFT: Software Implemented Fault Tolerance", 2005, Publsihed by: IEEE, Proceedings of the International Symposium on Code Generation and Optimization (CGO'05).*

(Continued)

*Primary Examiner* — Hossain M Morshed
(74) *Attorney, Agent, or Firm* — Withrow & Terranova, P.L.L.C.

(57) ABSTRACT

Methods, apparatuses, systems, and implementations of a zero silent data corruption (ZDC) compiler technique are disclosed. The ZDC technique may use an effective instruction duplication approach to protect programs from soft errors. The ZDC may also provide an effective control flow checking mechanism to detect most control flow errors. The ZDC technique may provide a failure percentage close to zero while incurring a lower performance overhead than prior art systems. The ZDC may also be effectively applied in a multi-thread environment.

15 Claims, 10 Drawing Sheets

(56) References Cited

OTHER PUBLICATIONS

Rollins, "Hardware and Software Fault-Tolerance of Softcore Processors Implemented in SRAM-Based FPGAs", 2012, Publsihed by: Brigham Young University—Provo.*

Author Unknown, "ARM Cortex-A53 MPCore Processor," Technical Reference Manual, Revision r0p2, Feb. 14, 2014, ARM, 635 pages.

Bauman, Robert, "Soft Errors in Advanced Computer Systems," IEEE Design and Test of Computers, 2005, IEEE Computer Society, pp. 258-266.

Binkert, Nathan, et al., "The gem5 Simulator," Computer Architecture News, vol. 39, Issue 2, May 2011, ACM, 7 pages.

Blem, Emily, et al., "Power Struggles: Revisiting the RISC vs. CISC Debate on Contemporary ARM and x86 Architectures," 19th International Symposium on High Performance Computer Architecture, Feb. 2013, IEEE, 12 pages.

Feng, Shugang, et al., "Shoestring: Probabilistic Soft Error Reliability on the Cheap," Architectural Support for Programming Languages and Operating Systems, Mar. 13-17, 2000, Pittsburgh, Pennsylvania, ACM, 12 pages.

Karnik, Tanay, et al., "Characterization of Soft Errors Caused by Single Event Upsets in CMOS Processes," IEEE Transactions on Dependable and Secure Computing, vol. 1, Issue 2, Apr. 2004, IEEE Computer Society, pp. 128-143.

Kayali, Sammy, "Reliability Considerations for Advanced Microelectronics," Pacific Rim International Symposium on Dependable Computing, Dec. 2000, Los Angeles, California, IEEE, 1 page.

Khudia, Daya, et al., "Efficient Soft Error Protection for Commodity Embedded Microprocessors using Profile Information," Proceedings of the International Conference on Languages, Compilers, Tools and Theory for Embedded Systems, Jun. 12-13, 2012, Beijing, China, ACM, 10 pages.

Leveugle, R., et al., "Statistical Fault Injection: Quantified Error and Confidence," Design, Automation & Test in Europe Conference & Exhibition, Apr. 20-24, 2009, Nice, France, IEEE, 5 pages.

Lidman, Jacob, et al., "ROSE::FTTransform—A Source-to-Source Translation Framework for Exascale Fault-Tolerance Research," International Conference on Dependable Systems and Networks Workshops, Jun. 25-28, 2012, Boston, Massachusetts, IEEE, 6 pages.

Lyons, Daniel, "Sun Screen," www.forbes.com/forbes/2000/1113/6613068a.htm#756123496162, Nov. 13, 2000, Forbes Media LLC, 4 pages.

Mitropoulou, Konstantina, et al., "DRIFT: Decoupled CompileR-Based Instruction-Level Fault-Tolerance," Languages and Compilers for Parallel Computing, Sep. 25-27, 2013, San Jose, California, Springer International Publishing, pp. 217-233.

Oh, Nahmsuk, et al., "ED4I: Error Detection by Diverse Data and Duplicated Instructions," IEEE Transactions on Computers, vol. 51, Issue 2, Feb. 2002, IEEE, pp. 180-199.

Rebaudengo, Maurizio, et al., "A source-to-source compiler for generating dependable software," Proceedings of the IEEE International Workshop on Source Code Analysis and Maniupulation, Nov. 10, 2001, Florence, Italy, IEEE, 10 pages.

Rebaudengo, Maurizio, et al., "Soft-error Detection through Software Fault-Tolerance techniques," Proceedings of the International Symposium on Defect and Fault Tolerance in VLSI Systems, Aug. 6, 2002, Albuquerque, New Mexico, IEEE, 9 pages.

Reis, George, et al., "Design and Evaluation of Hybrid Fault-Detection Systems," Proceedings of the 32nd International Symposium on Computer Architecture, 2005, IEEE, 12 pages.

Reis, George, et al., "Software-Controlled Fault Tolerance," ACM Transactions on Architecture and Code Optimization, vol. 2, Issue 4, Dec. 2005, ACM, pp. 366-396.

Shivakumar, Premkishore, et al., "Modeling the Effect of Technology Trends on the Soft Error Rate of Combinational Logic," International Conference on Dependable System and Networks, 2002, IEEE Computer Society, 10 pages.

Shye, Alex, et al., "PLR: A Software Approach to Transient Fault Tolerance for Multicore Architectures," IEEE Transactions on Dependable and Secure Computing, vol. 6, Issue 2, Apr. 2009, IEEE Computer Society, pp. 135-148.

Wang, Cheng, et al., "Compiler-Managed Software-based Redundant Multi-Threading for Transient Fault Detection," International Symposium on Code Generation and Optimization, 2007, IEEE, 13 pages.

Yu, Jing, et al., "ESoftCheck: Removal of Non-vital Checks for Fault Tolerance," International Symposium on Code Generation and Optimization, 2009, IEEE Computer Society, pp. 35-46.

Zhang, Yun, et al., "DAFT: Decoupled Acyclic Fault Tolerance," Proceedings of the International Conference on Parallel Architectures and Compilation Techniques, Sep. 11-15, 2010, Vienna, Austria, ACM, 11 pages.

Zhang, Yun, et al., "Runtime Asynchronous Fault Tolerance via Speculation," Proceedings of the Tenth International Symposium on Code Generation and Optimization, Mar. 31, 2012, ACM, 10 pages.

* cited by examiner

METHODS, APPARATUSES, AND SYSTEMS FOR ZERO SILENT DATA CORRUPTION (ZDC) COMPILER TECHNIQUE

This application claims the benefit of U.S. 62/339,389 filed May 20, 2016.

STATEMENT REGARDING FEDERALLY FUNDED RESEARCH

This invention was made with government support under 1055094 awarded by the National Science Foundation. The government has certain rights in the invention.

BACKGROUND

1. Field of the Invention

This disclosure relates generally to methods, apparatuses, and systems that can be used to provide a zero silent data corruption (ZDC) compiler technique to reduce soft errors in computer processors.

2. Description of Related Art

Rapid technology scaling, the main driver in improving the power/performance of computing solutions, has rendered computing systems extremely susceptible to transient errors called soft errors. There may be many sources of transient faults in a system (e.g., electrical noise, external interference, cross-talk, etc.). Sub-atomic particles (e.g., low and high energy neutrons) striking on sensitive areas of a transistor may cause a majority of soft errors in electronic devices. These soft errors may cause large fiscal damages. With the current technology node, soft errors may occur in a high-end server once every 170 hours. However, these soft errors may increase exponentially and may be expected to reach alarming levels of one per day.

While many prior art solutions propose protection from soft errors by altering the hardware of the processor, software approaches can be applied to any existing processor. Furthermore, they can be applied more prudently. For example, soft error protection may be activated only for critical applications or the critical parts of the application. Among software approaches, in-application instruction duplication is one of the most popular and seemingly effective approaches. In such techniques, certain computational and logical instructions may be duplicated with different registers. At some synchronization points, such as memory operations, compares, branches, and function calls, the redundant registers may be checked against the original registers.

Software-oriented approaches to protect from soft errors have used redundancy at several levels. Replication has been implemented at a process level where system calls may become checking points. References may duplicate high-level program statements and may insert frequency checking of the results. Compiler-level redundant multi-threading approaches may generate two copies of each thread at a compilation time called a leader thread and a trailer thread. The leader thread may send critical values to the trailer thread for checking purposes. The trailer thread may compare the values received by the leader thread against its own values to detect possible errors. Instruction duplication can also be applied at the assembly level. For example, ED41 is an in-application instruction duplication scheme that duplicates all instructions except branches and compares. In ED41, checking instructions may be inserted before states and branches. Although this scheme may be effective, an error in a branch or compare instruction may still corrupt the program's output. In addition, since ED41 requires memory duplication, its performance overhead can be very high, especially for memory intensive applications.

Software Implemented Fault Tolerance (SWIFT) was proposed to improve the performance and fault coverage of ED41. In SWIFT, all computational instructions may be duplicated with different registers and checking instructions may be added before memory operations, compare instructions, and function calls. In order to reduce performance overhead and memory pressure, SWIFT may replace the duplicate load by a move from the first load when that memory is protected by other means such as error correcting codes (ECC). SWIFT may also propose a control flow checking (CFC) mechanism to detect control flow errors. SWIFT is considered to be a state-of-the-art approach that has completely eliminated silent data corruptions (SDCs). However, SWIFT actually has many limitations from a mixed hardware-software perspective. An ideal fault tolerant scheme should be able to completely protect all the microarchitectural components during the execution of all instructions of the program. SWIFT is unable to protect several important microarchitectural components as well as a significant fraction of instructions from SDCs. Therefore, a new approach is needed.

SUMMARY

This disclosure includes embodiments of a computing system for reducing silent data corruptions. In some embodiments, the computing system may include at least one memory device, at least one processor, and at least one physical computer readable medium coupled to the at least one memory device. The at least one physical computer readable medium may include computer executable instructions that may be executed by the at least one processor. In some embodiments, the computer executable instructions may be configured to perform a store instruction checking operation, perform a load instruction duplication operation, perform a compare instruction and branch instruction duplication operation, perform a branch direction checking operation, and perform a register file checking operation.

In some embodiments, the store instruction checking operation may comprise instructions to reload a value of a store instruction into a value register as a checking load instruction, and compare the checking load instruction with the store instruction. In some embodiments, the load instruction duplication operation may comprise instructions to duplicate a load instruction from a load store queue. In some embodiments, the compare instruction and branch instruction duplication operation may comprise instructions to duplicate a compare instruction, save the compare instruction as a value in a compare destination register and a value in a compare check register, duplicate a branch instruction, and conditionally invert the value of the compare destination register based on a direction of the branch instruction and the duplicate of the branch instruction. In some embodiments, the branch direction checking operation may comprise instructions to check a basic destination block by comparing one or more static signatures. In some embodiments, the register file checking operation may comprise instructions to compare a value in a shadow register with a master register after a store instruction.

In some embodiments, the executable instructions may be further configured to compare a load destination register value with a shadow load destination register value; determine whether the load destination register value matches the shadow load destination register value; and execute a load diagnostic process when the load destination register value does not match the shadow load destination register value. In some embodiments, the load diagnostic process may comprise instructions to check a base address register and a shadow base address register for errors; and avoid a propagation of a detected error to a storage device. In some embodiments, the load diagnostic process may comprise instructions to re-execute redundant load instructions when an error is not detected.

In some embodiments, the executable instructions may be further configured to execute a swap instruction to remove data present in a memory storage location into a register and write a register value into the memory storage location; compare a store destination register value with a shadow store destination register value; determine whether the store destination register value matches the shadow store destination register value; and execute a store diagnostic process when the store destination register value does not match the shadow store destination register value. In some embodiments, the store diagnostic process may comprise instructions to check a base address register and a shadow base address register for errors; and avoid a propagation of a detected error to a storage device. In some embodiments, the store diagnostic process may comprise instructions to re-execute the swap instruction when an error is not detected.

In some embodiments, a method of reducing silent data corruptions may comprise performing a store instruction checking operation, performing a load instruction duplication operation, performing a compare instruction and branch instruction duplication operation, performing a branch direction checking operation, and performing a register file checking operation.

In some embodiments, an apparatus for reducing silent data corruptions may include at least one processor configured to perform a store instruction checking operation, perform a load instruction duplication operation, perform a compare instruction and branch instruction duplication operation, perform a branch direction checking operation, and perform a register file checking operation.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the disclosed methods, systems, system components, or method steps can consist of or consist essentially of—rather than comprise/include/contain/have—any of the described elements, steps, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The foregoing has outlined rather broadly certain features and technical advantages of embodiments of the present invention in order that the detailed description that follows may be better understood. Additional features and advantages will be described below. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

The following drawings illustrate by way of example and not limitation. For the sake of brevity and clarity, every feature of a given method or system is not always labeled in every figure related to that method or system. Identical reference numbers do not necessarily indicate an identical feature. Rather, the same reference number may be used to indicate a similar feature or a feature with similar functionality, as may non-identical reference numbers.

DETAILED DESCRIPTION OF ILLUSTRATIVE EMBODIMENTS

Figure 1:
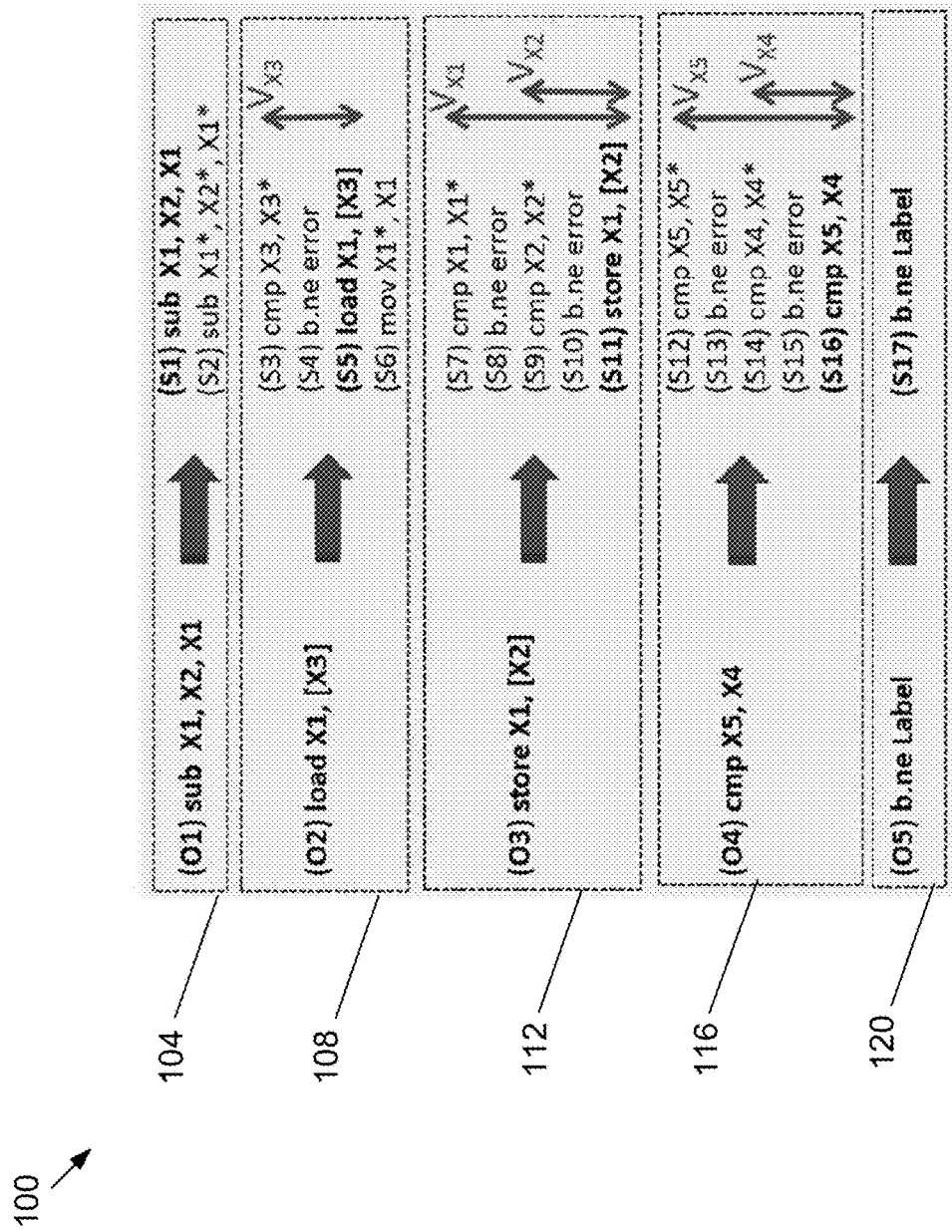
FIG. 1 illustrates an exemplary transformation process according to a prior art embodiment.

As discussed above, SWIFT suffers from numerous drawbacks that may result in several gaps in its soft error protection coverage. For example, the execution of non-duplicated instructions may not be protected. Referring now to the drawings, FIG. 1 illustrates an exemplary basic SWIFT transformation 100. In the transformation shown, SWIFT duplicates the arithmetic and logical instructions. In the embodiment shown, the original sub-instruction (O1) 104 is duplicated into two instructions (S1 and S2) with different sets of registers called master and shadow registers. However, in this transformation, all other instructions (e.g., loads, stores, compares, branches, function calls) are not duplicated. To illustrate this, the embodiment shown in FIG. 1 shows that the load instruction (O2) 108 is not duplicated. The address register of the load (X3) may be checked against its shadow (X3*) before the execution of the load (S3), any error may be reported (S4), and the loaded value may be moved to the duplicate register (S6). The store instruction (O3) 112 may also not be duplicated; there may be only one store (S11). Its operands may be checked against their shadows before the store (S7, S9), any error may be reported (S13, S15), and the comparison may then be performed (S16). The compare instruction (O4) 116 may also not be duplicated. The operands of the compare may be checked (S12, S14), any error may be reported (S13, S15), and the comparison may then be performed (S16). Therefore, while the execution of duplicated instructions may be protected, the execution of non-duplicated instructions may not be completely protected. This may result in undetected soft errors that occur in the microarchitectural resources that are used by these instructions. For example, if there is a soft error in a pipeline register during the execution of the compare instruction (S16), then that error may not be detected and may cause a SDC. Branch instructions (O5) 120 may also not be duplicated. Moreover, to apply SWIFT, a program must be compiled with only half of the registers because the other half must be reserved as shadow registers. This may cause register spilling and may increase the number of loads and stores in the program. Furthermore, the microarchitectural components used by these instructions may include pipeline registers, a fetch queue, a reorder buffer, a commit queue, functional units (FUs), etc. These components may comprise a major portion of the processor state given that larger cache-like components such as branch predictors and translation lookaside buffers (TLBs) may be routinely protected in modern processors.

Another drawback of SWIFT is that the register file may not be completely protected. Although the duplicates may be checked before every non-duplicated instruction, the non-duplicated instructions themselves contained in the register may be vulnerable. Referring back to FIG. 1, one such vulnerability is the transformation for the store instruction (O3) 112. Before executing the store instruction (S11), the duplicates may be compared (S7, S9) and any error may be reported (S8, S10). However, register X1 may be vulnerable to errors from the time the duplicates are compared (S7, S9) to the time the store instruction is executed (S11). This time period is illustrated by vertical line segment $V_{X1}$. Similarly, register X2 may be vulnerable to errors from the time initial errors are reported (S8, S10) to the time the store instruction is executed (S11). This time period is illustrated by vertical line segment $V_{X2}$.

Figure 2:
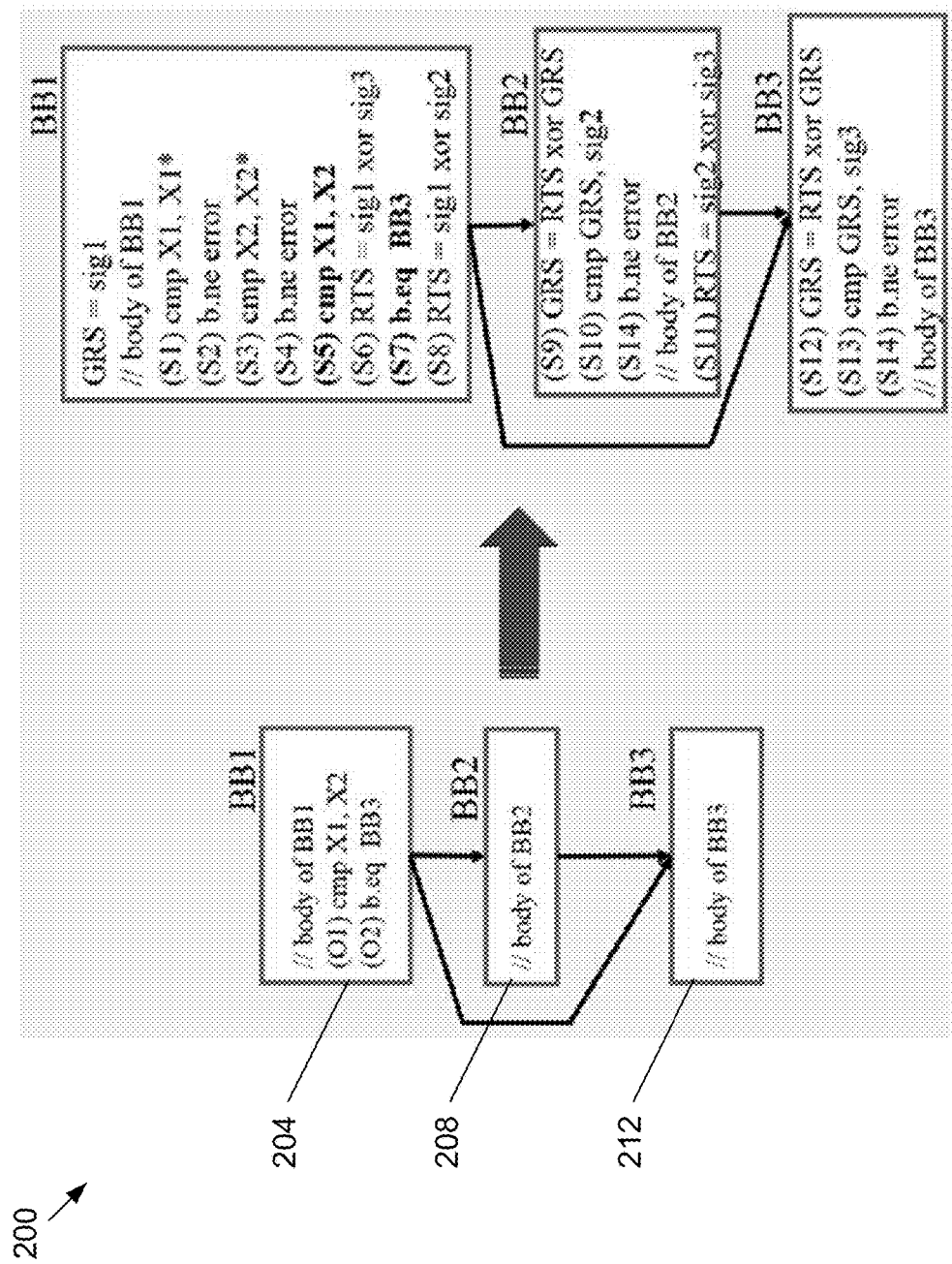
FIG. 2 illustrates an exemplary control flow checking (CFC) mechanism according to a prior art embodiment.

Another drawback of SWIFT is that the load store queue (LSQ) in the processor may not be protected. Since the execution of load/store instructions is not protected and only these instructions use the LSQ, errors in the LSQ may therefore go undetected. Another drawback of SWIFT is that wrong direction branches may not be detected. A wrong direction branch may occur if the control flow (CF) of a program alters in a way that a taken branch changes to a non-taken branch or vice versa. A wrong direction branch may be caused by a soft error on four components: (1) registers that hold the operands of a compare instructions, (2) pipeline registers executing compare instructions, (3) a conditional code register, and (4) pipeline registers holding the opcode of a branch instruction. However, the SWIFT CFC mechanism may only partially protect the first component from soft errors while the rest remain unprotected. FIG. 2 illustrates the SWIFT CFC scheme 200. SWIFT uses basic block signatures to detect CF errors. These signatures are assigned to the basic blocks statically. In the embodiment shown in FIG. 2, the basic blocks BB1 204, BB2 208, and BB3 212 are assigned signatures sig1, sig2, and sig3, respectively. By definition, the signature checking may allow CF changes from BB1 to either BB2 or BB3. As a result, if a soft error causes a wrong direction branch, the SWIFT CFC cannot detect it and it may result in a SDC.

Another drawback of SWIFT is that wrong target branches may not be detected. If a soft error affects the target address of a branch, a wrong target branch may occur. For example, if an error occurs on a functional unit register while computing the effective address of a branch or an error occurs on a branch target address buffer, the CF of a program may transfer to a wrong address. The ability of SWIFT CFC to detect these types of errors is extremely restricted. The SWIFT CFC can only detect wrong target branches having a destination at the beginning of a basic block. It cannot detect branching to the middle of any basic block because its signature checking only occurs at the beginning of the basic block.

According to the disclosed embodiments, a ZDC compiler technique may resolve these drawbacks of SWIFT and may almost eliminate SDCs altogether. Embodiments of the ZDC compiler technique may protect applications from soft errors by instruction duplication. More specifically, embodiments of the ZDC compiler technique: (a) may protect store instructions by reloading and checking the stored value, (b) may protect load instructions by duplicating the loads, (c) may protect compare and branch instructions by duplicating them, (d) may detect wrong direction branches by using direction checking and signature checking, and (e) may protect the register file by checking the duplicate registers after a non-duplicated instruction instead of before the non-duplicated instruction.

Figure 3:
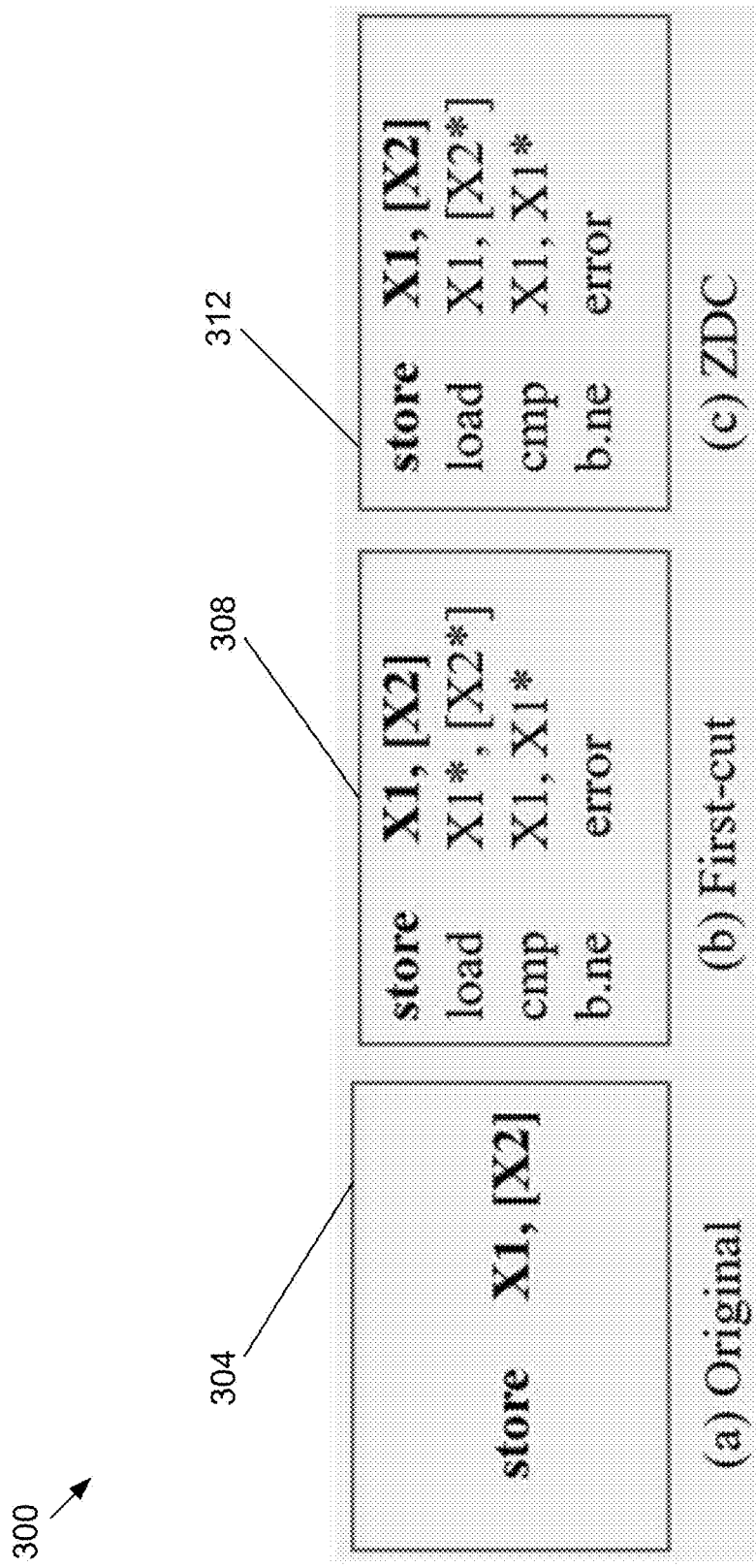
FIG. 3 shows an exemplary zero silent data corruption (ZDC) store checking mechanism according to an embodiment of the disclosure.

In the embodiment shown in FIG. 3, the ZDC compiler technique 300 protects store instructions by reloading and checking the stored value. This may ensure that the store instruction may be executed fault free. The ZDC compiler technique may load back the stored value from the memory and check it against the stored value. In this embodiment, if the loaded value matches the stored value, it is determined that there is no error. If the loaded value does not match the stored value, it is determined that there is an error and an error handling routine may be activated. FIG. 3 illustrates an embodiment of the ZDC compiler technique 300. A store instruction 304 is depicted. In a first-cut version 308 of the load checking mechanism, errors which affect the address of the store instruction contained in index register X2 may be detected. However, errors altering the value stored in data register X1 can simply propagate from the store's data register to the checking load registers and remain undetected. For example, if a soft error alters the value of X1, the store instruction may write this corrupted value into memory. The checking load instruction may then load the corrupted value as shadow value X1*. In this case, both the value X1 and shadow value X1* may be corrupted and a comparison of the two may not catch a soft error. This may occur because the value register of the checking load instruction is the shadow of the value register of the store instruction. In an embodiment of the ZDC load checking mechanism 312, stores may be protected by using the same value register for both store and checking load instructions and later checking the value register against its shadow to detect possible errors. In this embodiment, in addition to protecting the producer chains of store values and address registers, the execution of the store instruction itself is also protected.

Due to a store-to-load forwarding mechanism in the LSQ of a typical modern microprocessor, the checking load instructions may normally take their values from the store buffer and execute quickly. While this may reduce the performance overhead of the ZDC compiler technique, if an error occurs on the store buffer after it has forwarded its data to the checking load instruction, the error may remain undetected. This unprotected interval may be removed in two ways: (1) flushing the store buffer after each store, or (2) using ECC in the store buffer. While the former solution may result in significant performance degradation, the latter solution may have minimal performance overhead and may not require any extra hardware. However, the ECC code may be generated before the store arrives at the store buffer.

Figure 4:
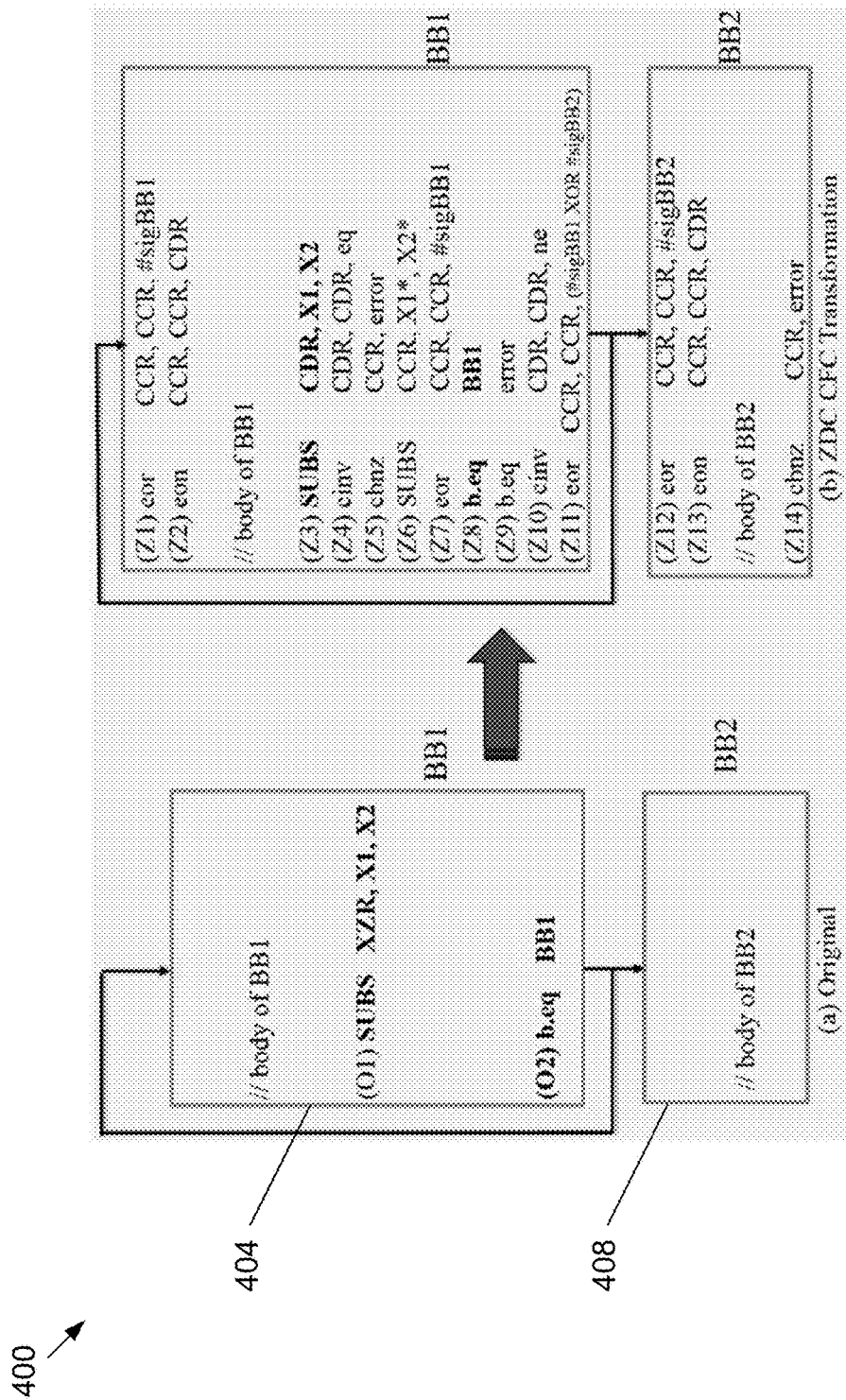
FIG. 4 shows an exemplary ZDC CFC transformation according to an embodiment of the disclosure.

In the embodiment shown in FIG. 4, a ZDC compiler technique 400 performs a CFC transformation for a loop having basic blocks BB1 404 and BB2 408. This may allow the ZDC compiler technique to detect wrong direction branches with its CF mechanism. An effective CFC mechanism may be able to protect all of the CF determining parts of the execution. This may include operands of compare instructions, pipeline registers while executing compare instructions, conditional registers using negative, zero, overflow, and carry (NZVC) flags, and branch instructions. The embodiment shown in FIG. 4 effectively protects all CF determining components. In some embodiments, the ZDC CFC mechanism may use two general purpose registers called the compare destination register (CDR) and the compare check register (CCR). The ZDC CFC mechanism may duplicate compare instructions, save the results in the CDR and CCR, conditionally invert the value of the CDR based on the direction of the following conditional branch and branch duplication, and use static signatures to ensure that the destination block is legal.

In the CFC transformation embodiment shown in FIG. 4, the original compare instruction (O1) is a subtraction operation which may update the NZVC flags and disregard the output. First, the CFC transformation saves the result of the subtraction (compare) operation in the CDR (Z3) and replicates the compare instruction (Z6). In a fault free run of a program, the results of duplicated compare instructions may always be equal. If an error occurs on registers that contain the operands of a compare instruction or an error occurs on pipeline registers while executing a compare instruction, the values in the CDR and CCR may be different and the error may be detected.

Second, the CFC transformation may conditionally invert the value of the CDR before the branch (Z4) or after the branch (Z9) based on provided conditional instructions. In some embodiments, the condition of these two conditional instructions is always opposite. Therefore, in this embodiment, the values of the CDR and the CCR should always be inverse of each other at the beginning of the next basic block (BB1 404 or BB2 408) regardless of the direction of the branch. Because the conditional invert instruction (Z4) and the condition branch read instruction (Z8) register values at two different instances of time set by two different instructions (main and redundant compare instructions), an error on the condition register may result in zero or two inversions on the CDR. Therefore, if the values of the CDR and the CCR are not inverse at the beginning of the next block, the CF checking instructions may detect the error. Errors that happen on the opcode of a condition branch that alter the branch from not taken to taken may result in no inversion on the CDR and may be detected by the CF checking instructions. The CFC transformation may introduce a redundant branch instruction (Z9) to detect errors that change the direction of the branch from taken to not taken. In the embodiment shown, the CF of the program should not be changed by the redundant branch in a fault-free run. If the main branch is taken, the control may never reach the redundant branch. Similarly, if the main branch is not taken, the redundant branch may also be not taken. However, if an error occurs on the opcode of the main branch and changes the branch from taken to not taken, the redundant branch may involve an error handler routine.

In the embodiment shown in FIG. 4, the ZDC CFC mechanism may detect wrong target branches. CFC instructions may be inserted at the beginning and near the end of each basic block 404, 408 in the third step of CFC transformation. This result of an XNOR (exclusive NOR) operation of two inverse values may always be zero. Therefore, at the beginning of each basic block 404, 408, the ZDC CFC mechanism may XNOR the CCR and CDR together and put the results on the CCR (Z2 and Z13). In a fault-free run, the value of the CCR should be zero at this point. Before the next write to the CCR, the ZDC CFC mechanism may check to see if the CCR value is zero (Z5 and Z14). If the value is not zero, an error handler routine may be involved. The distance between setting the CCR value and checking it may enable the ZDC CFC mechanism to detect errors that change the branch target to the body of a basic block 404, 408. The ZDC CFC mechanism may also use a static signature to check if the next basic block is legitimate (Z1, Z7, Z11, Z12).

In the embodiment shown, the ZDC CFC mechanism may eliminate vulnerable intervals of the register file. Because the ZDC compiler technique may check master registers against redundant registers after the store instruction rather than before, it may eliminate the register file vulnerability intervals cause by store operations. In the case of function calls, the ZDC compiler technique may check all master registers against the redundant registers at the beginning of the callee function rather than before the function call.

In order to evaluate the effectiveness of SWIFT and the ZDC compiler technique, experiments in extensive fault testing may be performed. Instead of injecting faults just on a processor's register file, faults may be injected on all the major sequential components of the processor. This may include pipeline registers, the LSQ, functional units, and the scoreboard. Other components may either not be vulnerable (e.g., the branch predictor) or may already be assumed to be protected (e.g., the caches and TLBs). In addition, to show the effectiveness of the ZDC control flow checking mechanism, fault injection may be performed on the branch and compare instructions while they are in the processor's pipeline.

For each fault site, a random bit at a random time may be selected and inverted. For example, in the case of a register file, a bit and a cycle may be selected randomly for fault injection. A simulation may run the program normally until it reaches the selected cycle. The value inside the selected bit may then be inverted and the program may run until completion or until reaching an allowable simulation time (which may be 10 times the nominal execution time). In some embodiments, for each fault site, 400 faults may be injected to allow a 5% margin of error and a 95% confidence interval. Therefore, for each version of the program (i.e., original, SWIFT, ZDC), 2400 fault injection experiments may be performed. Among them, 2000 faults may be injected into the register file, pipeline registers, LSQ, functional units, and scoreboard, while the remaining 400 faults may be specifically injected into the main branch and compare instructions. Overall, 72,000 faults may be injected into various components of the processors. Since a main goal of the experimentation is to prevent a program from producing a wrong output due to soft errors, the result of each fault injection may be classified into two categories: (1) SDC results that are simulation runs that produce incorrect outputs and are terminated without generating any detection alert, segmentation faults, or crashes, and (2) Other results that cover all other scenarios such as masked faults, detected faults, segmentation faults, and crashes.

Figure 5:
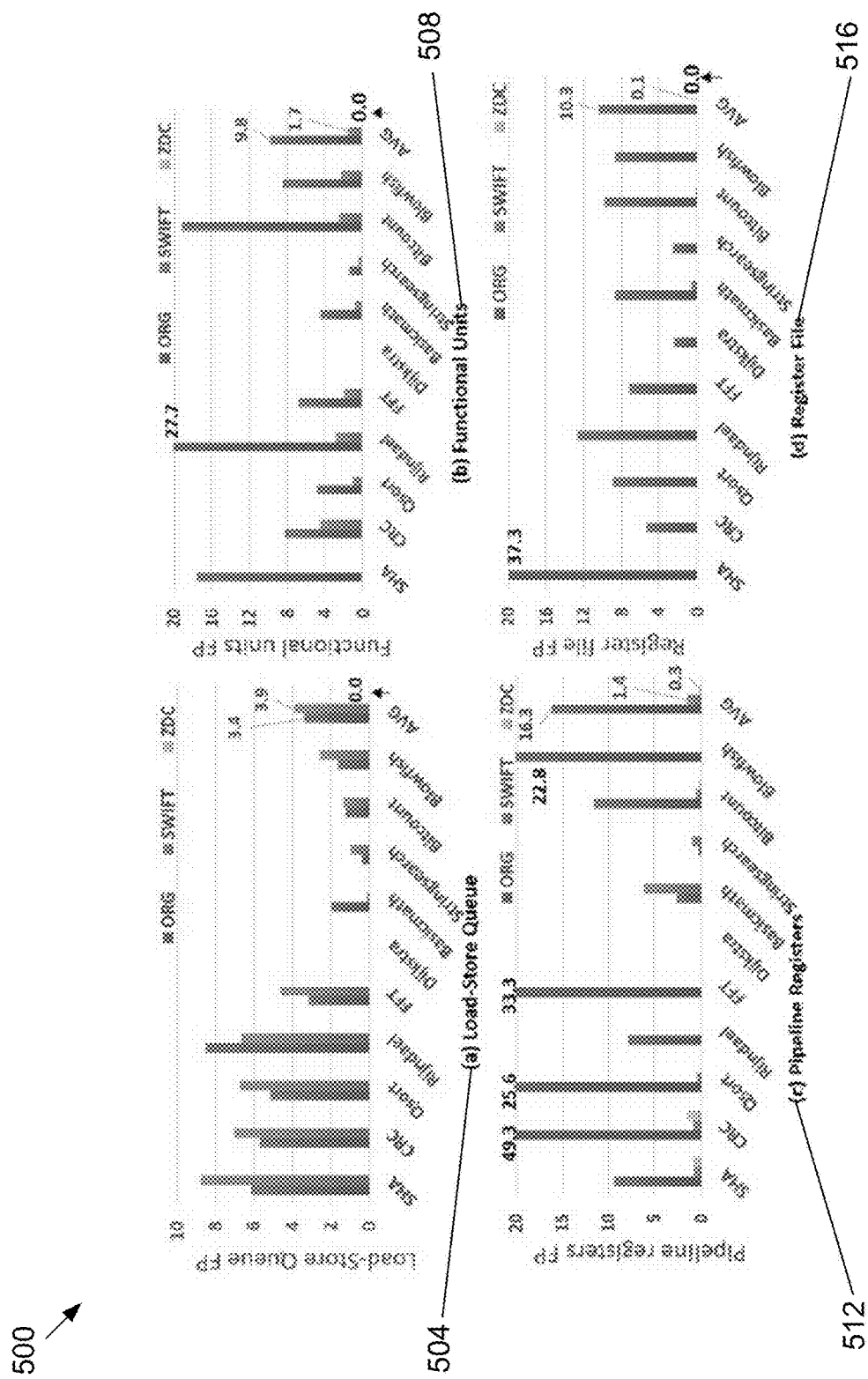
FIG. 5 shows various component failure percentages (FP) resulting from fault injection testing of an embodiment of the disclosure.

FIG. 5 shows graphs 500 that illustrate exemplary failure percentages (FP) when faults are inserted in the hardware component. In each graph, the FP is plotted on the Y-axis for the benchmarks on the X-axis. In the embodiment shown, the FP is presented for the original, SWIFT, and ZDC versions of the benchmarks for the load store queue (LSQ) 504, the functional units (FUs) 508, the pipeline registers 512, and the register file 516. LSQ benchmarks 504 show the FP obtained from fault injection experiments on the LSQ. For the LSQ, the FP actually increases from 3.4% for the original program to 3.9% for SWIFT. As mentioned previously, because SWIFT cannot protect loads and stores because they are only executed once, the LSQ may be vulnerable to soft errors. In fact, SWIFT may be more vulnerable than the original program because almost half of the registers are used for redundant instructions. This may increase register pressure and increase the spill code, which may cause a spike in the number of load and store instructions. This may lead to an increase in the number of entries in the LSQ, thereby increasing the probability that a fault may cause an error or failure. On the other hand, it is shown that ZDC has a 0% failure rate because it may protect loads by duplicating them and may protect stores by reading the stored value again and checking against a duplicate value.

FU benchmarks 508 show the result of fault injection of FUs. For FUs, it is shown that the average FP for the original and SWIFT versions of the programs is 9.8% and 1.7%, respectively. Almost all of the failures in SWIFT may be attributed to faults affecting FUs while computing the effective addresses of memory instructions. On the other hand, it is shown that there is a 0% failure rate for programs protected with the ZDC mechanism. Pipeline register benchmarks 512 show the FP obtained from fault injection trails on pipeline registers. As shown, the original program and SWIFT have FPs of 16.3% and 1.4%, respectively, while the ZDC has a FP of 0.3%. In this case, ZDC does not show a 0% failure rate due to limitations of the evaluation methodology. Due to working with unmodified library calls, a soft error may occur on the destination register pointer part of a checking instruction before a library call. In this case, the fault may change the destination register from register Zero to register X1, which may already have been checked. As a result, the argument value of the library function call may be wrong and produce SDCs. In cases where all code, including libraries, are tested by ZDC, a 0% FP rate may be expected. Register file benchmarks 516 show the FP for the register file. As shown, the FPs for the original, SWIFT, and ZDC may be 10.3%, 0.1%, and 0.0%, respectively. Although the register file FPs for SWIFT and ZDC are nearly identical, with SWIFT, there is always a chance of SDC caused by soft errors in the register file due to register file vulnerability periods. These periods are shown by the vertical lines $V_{X1}$-$V_{X5}$ in FIG. 1. On the other hand, the FP of ZDC is 0% because ZDC can completely close the register file vulnerability intervals by performing checking instructions after the memory write instructions instead of before them. In addition, because all injected faults on the scoreboard are masked, the scoreboard has been shown to exhibit a very low sensitivity to transient faults.

Figure 6:
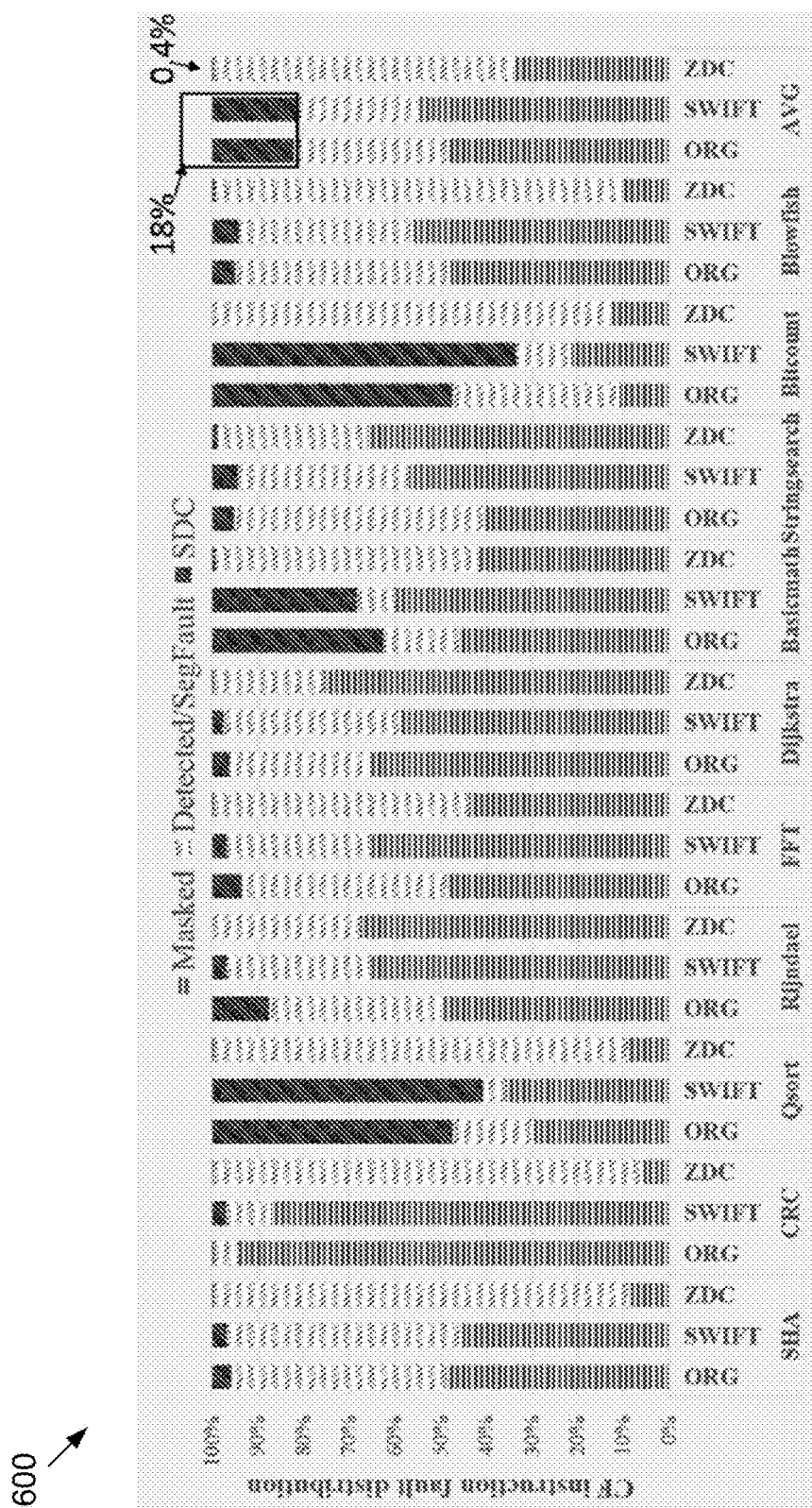
FIG. 6 shows fault injection results based on testing of an exemplary ZDC CFC mechanism according to an embodiment of the disclosure.

FIG. 6 shows exemplary results 600 of fault injection on the branch address and compare instructions of the programs to examine the efficacy of the ZDC control flow mechanism. Faults may be injected randomly on the branch and compare instructions (excluding checking instructions) while they are in the pipeline registers and conditional registers. Because the target of fault injections may be selected among the program original instructions, FIG. 6 shows the amount of masked faults, detected and/or segmentation faults, and SDCs. The detected and/or segmentation faults portion of the stacked bars may demonstrate the percentage of injected faults that were either detected by SWIFT or ZDC or detected by the OS as a segmentation fault. As shown by FIG. 6, both the original and SWIFT may exhibit a failure rate of about 18% SDCs. This high failure rate may be due to the SWIFT CFC's inability to detect wrong direct branches at the middle of a basic block. Instead, the SWIFT CFC can only detect wrong direct branches at the beginning of a basic block, making the SWIFT CFC essentially ineffective. On the other hand, the ZDC CF mechanism can detect about 55% of faults with just 0.4% of faults resulting in SDCs.

Figure 7:
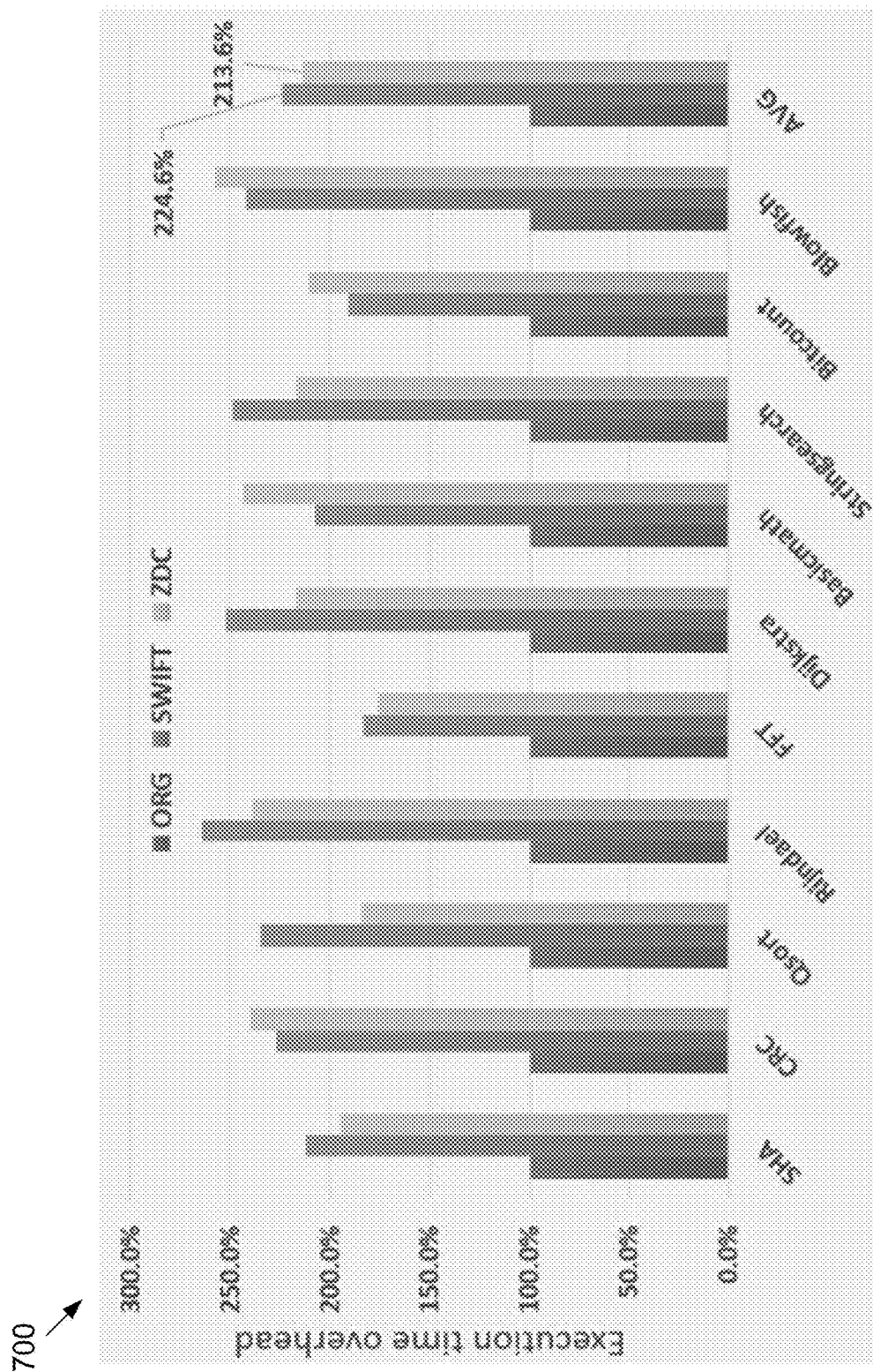
FIG. 7 shows execution time overhead results based on testing of an embodiment of the disclosure.

FIG. 7 shows exemplary results 700 of performance overhead of both SWIFT and ZDC for an in-order Advanced RISC Machines (ARM) processor. On average, the execution time overhead for SWIFT and ZDC is about 224% and 213%, respectively. Therefore, ZDC incurs 10% less performance overhead than SWIFT while providing a higher level of error protection. While these performance overhead numbers may be higher than those reported by prior systems, those systems duplicate only the user source code when including the execution time of the library instructions in the total execution time. This may result in a lower percentage overhead of the duplication scheme but, as discussed above, such a duplication scheme may not be as effective at preventing errors. On the other hand, FIG. 7 excludes the execution time of library routines towards the total execution time and only considers the execution time of the source code. This results in a higher overhead percentage but a more effective error prevention scheme.

In the embodiments discussed above, ZDC relax-load duplication can effectively close all load-related vulnerable windows. However, in some instances, this may also introduce a problem in a multi-threaded/multi-core environment. Generally, there is no guarantee that two consecutive memory read operations from the same memory location receive the same data because there is a chance that an intervening memory write operation from other thread(s) from the same core or other core(s) changes the state of memory. A single-threaded ZDC transformation may decipher such an inconsistency as the manifestation of a soft error and may raise the error flag even though there was no error. Therefore, applying a single-threaded ZDC technique to a multi-threaded environment requires some modifications because the state of the memory can get updated by other threads running on the same core or on different cores.

Figure 8:
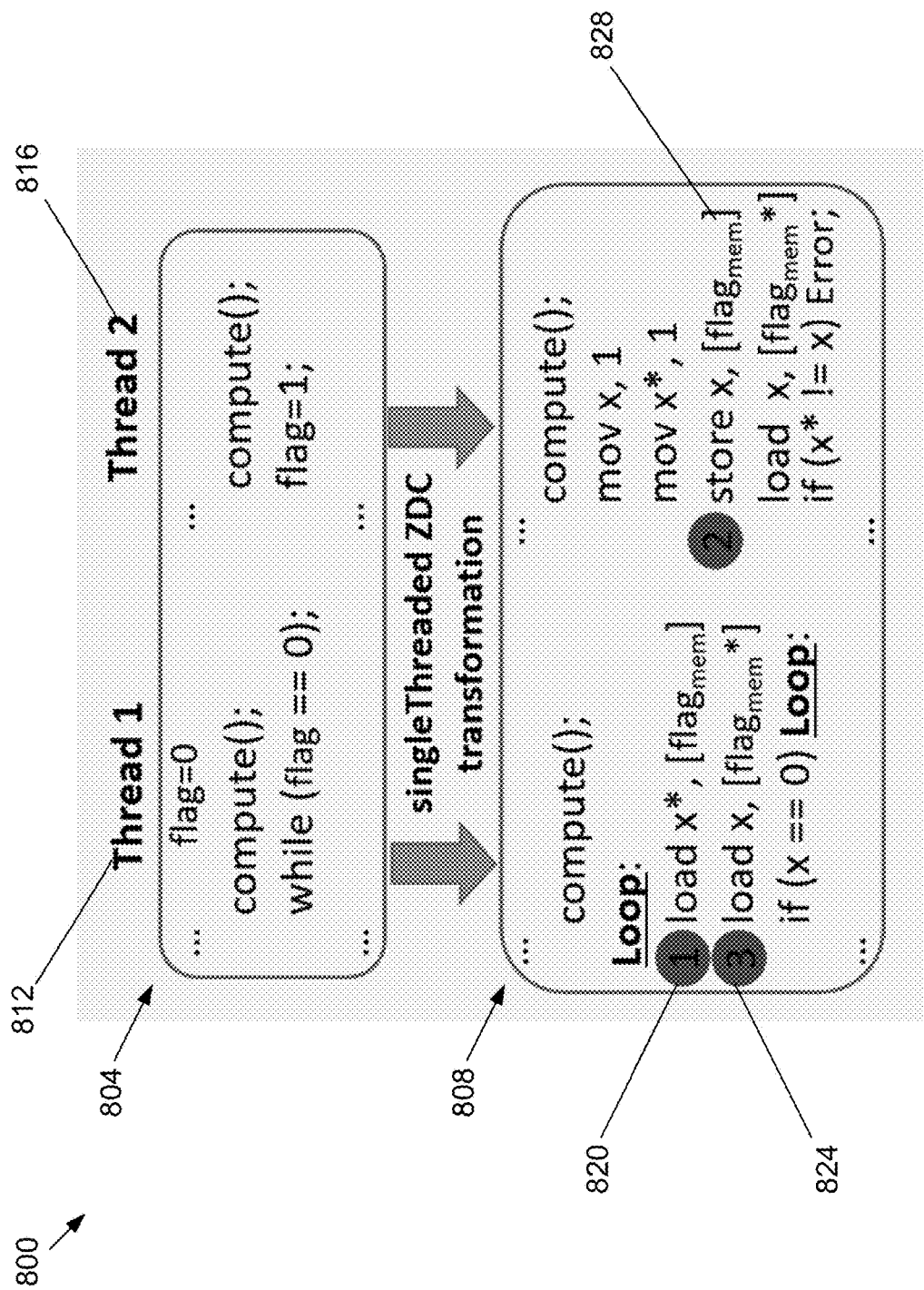
FIG. 8 shows an exemplary application of a single-threaded ZDC mechanism to a multi-threaded program according to an embodiment of the disclosure.

FIG. 8 illustrates an example multithreaded program 800 where applying a single-threaded ZDC mechanism may cause inconsistency in a multithreaded environment that can lead to a false alarm. In the embodiment shown in FIG. 8, a simple two-threaded program 804 is shown along with a ZDC-protected version 808 of the program 804. In the embodiment shown, program 800 consists of two threads 812, 816 which are synchronized through a shared variable flag. In the embodiment shown, thread 812 performs some computations and waits until thread 816 sets a flag variable. In the embodiment shown, program 800 does not have any non-deterministic behavior by itself. In the embodiment shown, a single-threaded ZDC transformation is applied to two-threaded program 804. The corresponding ZDC-protected assembly code 808 is shown. In the embodiment shown, ZDC-protected version 808 has a load operation 820 and a redundant load operation 824 in thread 812 and sets a flag variable 828 in thread 816. Since the ZDC transformation duplicates load operation 820 (which is required for reading the flag variable 828 from the memory), the duplicated loads will read different values if thread 816 sets the flag variable 828 (e.g., by a store instruction) between load 820 and redundant load 824. This inconsistency in values may ultimately cause a false alarm and stop the program execution.

Therefore, in order to provide a thread-safe memory read operation duplication, an additional checking instruction may be added after duplicated loads that jumps to a diagnosis basic block if a mismatch is observed. In the diagnosis basic block, the load source register operand(s) are first checked to ensure they are fault-free. If this check passes, normal execution of the program resumes by re-executing duplicated load instructions. Otherwise, an error flag will be raised with a hint that a soft error is detected but memory is safe because the error is local to the thread and is not propagated to the memory. An exemplary embodiment of this process is shown in FIG. 9.

Figure 9:
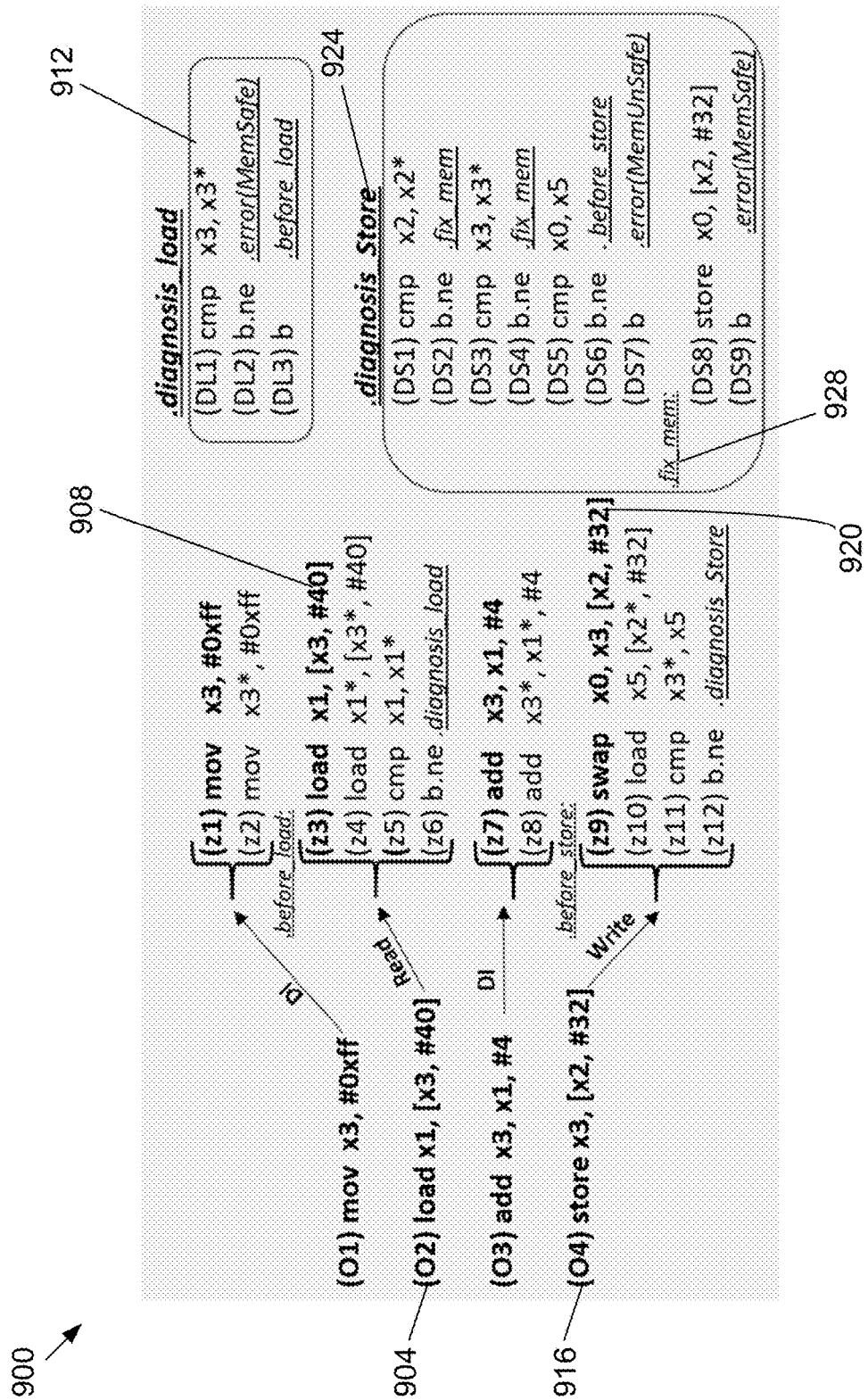
FIG. 9 shows an exemplary thread-safe ZDC transformation according to an embodiment of the disclosure.

FIG. 9 shows an exemplary thread-safe ZDC data-flow protection transformation 900 for a simple snippet code in a multi-thread environment. In the embodiment shown, original load instruction (O2) 904 is transformed into multiple instructions 908. As shown, after duplicated load instructions (i.e., (z3) and (z4)), checking instructions may be inserted (i.e., (z5) and (z6)). In the embodiment shown, these instructions compare the load destination registers (i.e., x1 and x1*) and transfer the program control to a ".diagnosis_load" block 912 if there is any inconstancy. In the diagnosis block 912 (i.e., "diagnosis_load"), the memory reads the base address registers (i.e., x3 and x3*) and checks then for errors (i.e., (DL1)). In the embodiment shown, in case of mismatch, an error detection flag will rise and alert that an error is detected. In the embodiment shown, the error then modifies the execution of the thread and prevents propagation to the memory (i.e., (DL2)). This information regarding the scope of error can be useful for error recovery purposes in that the application can decide whether the recovery is necessary, and if so, whether all threads should be rolled back or not.

If there is no error in replicated load address registers, there can be two possibilities for the inconsistency: (1) the soft error happened during the execution of one of the load instructions and altered the effective address, or (2) an intervening store from the other thread modified the state of the memory. Either way, by jumping back to right before the redundant-load instructions (i.e., (z3) and (z4)), this problem is solved. If the soft error is the reason for the discrepancy, a simple re-execution of the redundant-load instructions can provide recovery. If the discrepancy comes from an intervening store instruction as shown in FIG. 8, the problem can be solved by repeating the execution of redundant loads. In some embodiments, a counter can be used in the diagnosis block 912 to prevent deadlock such as from infinite loops caused by constant memory updating by other threads.

Figure 10:
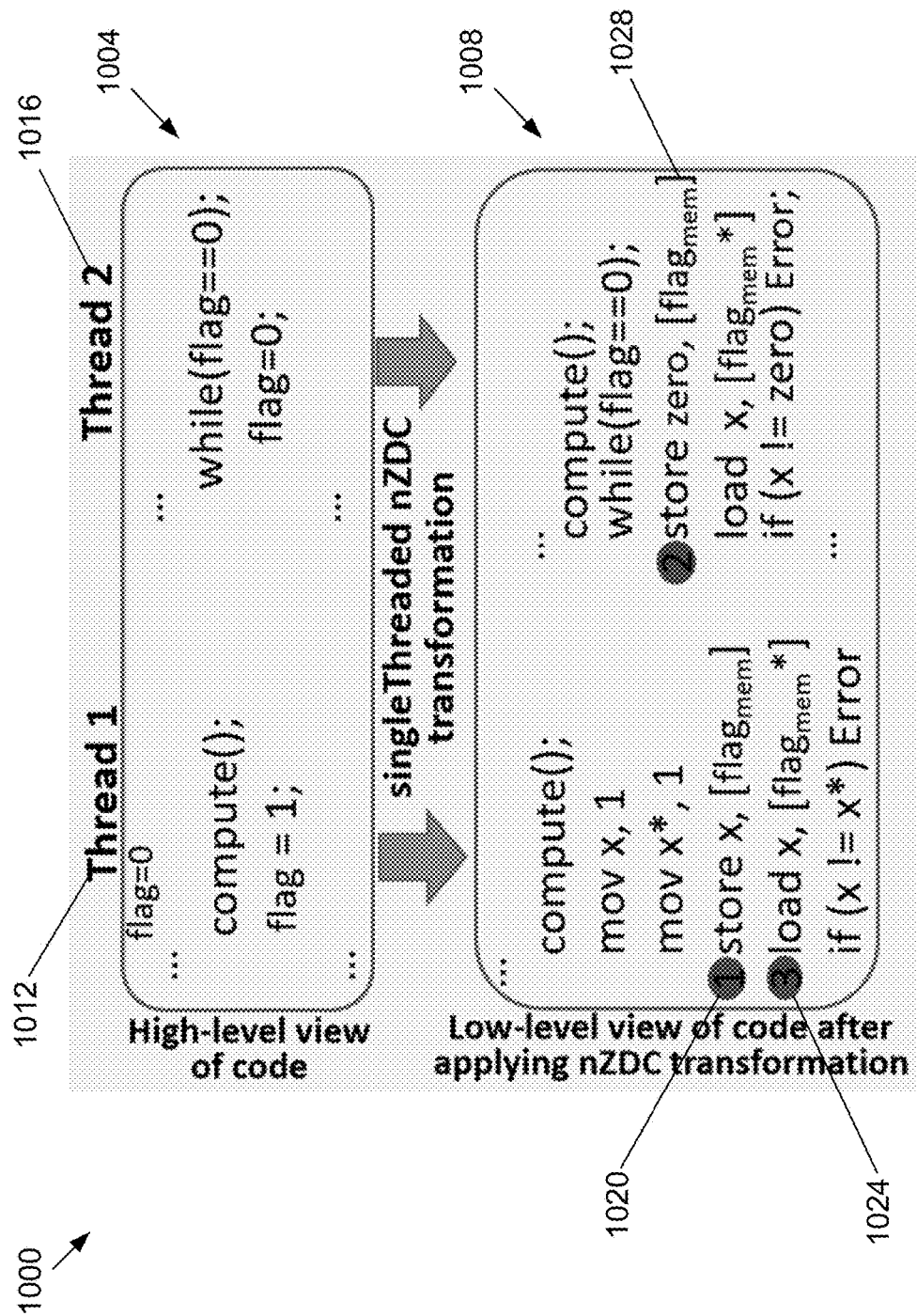
FIG. 10 shows another exemplary application of a single-threaded ZDC mechanism to a multi-threaded program according to an embodiment of the disclosure.

In a multi-threaded/multi-core environment, using a checking-load instruction can also lead to false alarm if a memory write instruction from another thread modifies the state of memory between the store and checking-load instruction. FIG. 10 illustrates an example multithreaded program 1000 where applying a single-threaded ZDC mechanism may cause inconsistency in a multithreaded environment that can lead to a false alarm. In the embodiment shown in FIG. 10, a simple two-threaded program 1004 is shown along with a ZDC-protected version 1008 of the program 1004. The program 1004 consists of two threads 1012, 1016 which uses a shared flag variable for synchronization. In the embodiment shown, thread 1012 performs some computations and sets a flag variable. In the embodiment shown, thread 1016 checks the flag in a loop and waits till the flag gets set. Once the flag is set, thread 1016 exits from the loop, clears the flag, and proceeds its execution. However, despite the fact that high-level program 1000 doesn't suffer from any inconsistency, applying a single-threaded ZDC transformation makes the code non-deterministic. For instance, if the instructions get executed in the order shown in FIG. 10, thread 1012 can raise the error flag when there is no error. This is because thread 1016 updates the state of memory between setting the flag and checking it in thread 1012. Specifically, in the embodiment shown, ZDC-protected version 1008 has a store operation 1020 and a load checking operation 1024 in thread 1012 and sets a flag variable 1028 in thread 1016. In this embodiment, the memory storage and the load check will read different values if thread 1016 sets the flag variable 1028 (e.g., by a load instruction) between store instruction 1020 and checking instruction 1024. Similar to the case shown in FIG. 8, this inconsistency in values may ultimately cause a false alarm and stop the program execution.

In order to provide a thread-safe memory write checking mechanism, the original store instruction can be replaced with a swap instruction to employ a load checking strategy. In an ARMv8 instruction set architecture (ISA), a "swap" instruction can have two source operands and a target memory location and can perform two operations automatically. First, it can load the value from the target memory location into its first operand, and, second it can write its second operand into the target memory location. For an x86 ISA, an exchange instruction (i.e., "xchg") can be used.

A ZDC memory write instruction transformation is shown in FIG. 9. In the embodiment shown, original store instruction (O4) 916 is transformed into multiple instructions 920. In the embodiment shown, in the corresponding thread-safe ZDC transformation, the original store instruction 916 is replaced with a swap operation (i.e., (z9)). In the embodiment shown, the swap instruction first loads the data present in memory location [x2, #32] into the register x0, and then it writes the x3 register value into the same memory location. In the embodiment shown, right after the swap instruction, a checking-load instruction is inserted (i.e., (z10)). In the embodiment shown, the address part of the checking-load instruction uses the corresponding shadow register x2* of the store instruction memory address register x2. In the embodiment shown, the destination register can be any free register but the store instruction shadow or master register operands or swap instruction first register operand. In the embodiment shown, in the last step, the destination register of checking-load instruction x5 gets compared against the shadow register of the store value register x3* and the program control transfers to a ".diagnosis_store" block 924 in the case of any mismatch.

In the embodiment shown, ".diagnosis_store" block 924 performs three checks: (1) an address register check, (2) a value register check, and, (3) a wrong-memory location modification check. If any of two first checks show a mismatch, ".diagnosis_store" block 924 restores the state of a wrongly-updated memory location to the state before execution of the swap instruction by writing the value inside the swap operand to the target-memory location. In the embodiment shown, a memory-safe error-flag is then raised. This denotes that the thread is erroneous and that the error is confined to the thread and does not propagate to the memory. In the embodiment shown, instructions DS1 and DS3 in ".diagnosis_store" block 924 are responsible for memory address and value register checks, respectively. In the embodiment shown, if a mismatch is observed, the execution redirects to a ".fix_mem" block 928 where instruction DS8 eliminates the effect of the error from the memory and an error flag is raised in instruction DS9.

However, in the embodiment shown, if the execution reaches to the third check in ".diagnosis_Store" block 924, it means either a soft error has occurred during the execution of the swap, checking-load, or checking instructions, or an intervening store has modified the state of memory in the short interval between the swap instruction and the following checking-load instruction. The effect of the error is easily recoverable in all above cases except when the error alters the address part of the swap instruction and an unknown memory location is updated. In the embodiment shown, this case can be realized by checking the swap destination register operand (i.e., the state of the targeted memory location before the memory write operation) against the checking-load destination register operand (i.e., the state of the targeted memory location after the memory write operation). If the values are the same, it means that an unknown memory location has been updated and the thread execution should be terminated because an error has been detected and has propagated to the memory. Otherwise, the error and/or the unexpected memory write from the other threads can be removed by re-executing the instructions from right before the swap instruction.

In summary, ZDC is a compiler-only instruction duplication fault tolerant technique that may completely protect the execution of programs against soft errors on various hardware components. ZDC is based on the idea that non-duplicated instructions may result in program failures. Therefore, by duplicating all instructions using ZDC, a nearly 0% failure rate may be achieved in software. However, since duplicating store and branch instructions may be problematic, ZDC may introduce checking load instructions and a new control flow checking mechanism to resolve these problems. Checking load instructions may be inserted after stores and check the stored value against its shadow. By duplicating compare and branch instructions, the ZDC control flow checking mechanism may be able to detect almost all control flow errors. Additionally, ZDC can be applied to multi-threaded environments by adding additional checking instructions after duplicated load instructions in a memory read instruction process and after a swap instruction in a memory write instruction process. In the event the additional checking instructions determine an inconsistency, ZDC can transfer execution to a separate diagnostic block to correct any error or inconsistency.

It may be appreciated that the functions described above may be performed by multiple types of software applications, such as web applications or mobile device applications. If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media includes physical computer storage media. A physical storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the disclosed methods, devices, and systems are not intended to be limited to the particular forms disclosed. Rather, they include all modifications and alternatives falling within the scope of the claims, and embodiments other than those shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A computing system configured to detect and reduce silent data corruptions, the computing system comprising:
   at least one memory device;
   at least one processor; and
   at least one physical computer readable medium coupled to the at least one memory device, the at least one physical computer readable medium comprising computer executable instructions that when executed by the at least one processor are configured to:
   perform a store instruction checking operation, wherein the store instruction checking operation comprises instructions to reload a value of a store instruction into a value register as a checking load instruction, and compare the checking load instruction with the store instruction;
   perform a load instruction duplication operation, wherein the load instruction duplication operation comprises instructions to duplicate a load instruction from a load store queue;
   perform a compare instruction and branch instruction duplication operation, wherein the compare instruction and branch instruction duplication operation comprise instructions to duplicate a compare instruction, save the compare instruction as a value in a compare destination register and a value in a compare check register, duplicate a branch instruction, and conditionally invert the value of the compare destination register based on a direction of the branch instruction and the duplicate of the branch instruction;
   perform a branch direction checking operation, wherein the branch direction checking operation comprises instructions to check a basic destination block by comparing one or more static signatures;
   perform a register file checking operation, wherein the register file checking operation comprises instructions to compare a value in a shadow register with a master register after a store instruction; and
   in response to determining an inconsistency during execution of the instructions, transfer execution to a separate diagnostic block to correct any error or inconsistency.

2. The computing system of claim 1, where the executable instructions are further configured to:
   compare a load destination register value with a shadow load destination register value;
   determine whether the load destination register value matches the shadow load destination register value; and
   execute a load diagnostic process when the load destination register value does not match the shadow load destination register value.

3. The computing system of claim 2, where the load diagnostic process comprises instructions to:
   check a base address register and a shadow base address register for errors; and
   avoid a propagation of a detected error to a storage device.

4. The computing system of claim 3, where the load diagnostic process comprises instructions to:
   re-execute redundant load instructions when an error is not detected.

5. The computing system of claim 1, where the executable instructions are further configured to:
   execute a swap instruction to remove data present in a memory storage location into a register and write a register value into the memory storage location;
   compare a store destination register value with a shadow store destination register value;
   determine whether the store destination register value matches the shadow store destination register value; and
   execute a store diagnostic process when the store destination register value does not match the shadow store destination register value.

6. The computing system of claim 5, where the store diagnostic process comprises instructions to:
   check a base address register and a shadow base address register for errors; and
   avoid a propagation of a detected error to a storage device.

7. The computing system of claim 6, where the store diagnostic process comprises instructions to:
   re-execute the swap instruction when an error is not detected.

8. A method of detecting and reducing silent data corruptions, the method comprising:
   performing a store instruction checking operation, wherein the store instruction checking operation comprises instructions to reload a value of a store instruction into a value register as a checking load instruction, and compare the checking load instruction with the store instruction;
   performing a load instruction duplication operation, wherein the load instruction duplication operation comprises instructions to duplicate a load instruction from a load store queue;
   performing a compare instruction and branch instruction duplication operation, wherein the compare instruction and branch instruction duplication operation comprises instructions to duplicate a compare instruction, save the compare instruction as a value in a compare destination register and a value in a compare check register, duplicate a branch instruction, and conditionally invert the value of the compare destination register based on a direction of the branch instruction and the duplicate of the branch instruction;
   performing a branch direction checking operation, wherein the branch direction checking operation comprises instructions to check a basic destination block by comparing one or more static signatures;
   performing a register file checking operation, wherein the register file checking operation comprises instructions to compare a value in a shadow register with a master register after a store instruction; and
   in response to determining an inconsistency during execution of the instructions, transfer execution to a separate diagnostic block to correct any error or inconsistency.

9. The method of claim 8, further comprising:
   comparing a load destination register value with a shadow load destination register value;
   determining whether the load destination register value matches the shadow load destination register value; and
   executing a load diagnostic process when the load destination register value does not match the shadow load destination register value.

10. The method of claim 9, where the load diagnostic process comprises:
- checking a base address register and a shadow base address register for errors; and
- avoiding a propagation of a detected error to a storage device.

11. The method of claim 10, where the load diagnostic process comprises:
- re-executing redundant load instructions when an error is not detected.

12. The method of claim 8, further comprising:
- executing a swap instruction to remove data present in a memory storage location into a register and write a register value into the memory storage location;
- comparing a store destination register value with a shadow store destination register value;
- determining whether the store destination register value matches the shadow store destination register value; and
- executing a store diagnostic process when the store destination register value does not match the shadow store destination register value.

13. The method of claim 12, where the store diagnostic process comprises:
- checking a base address register and a shadow base address register for errors; and
- avoiding a propagation of a detected error to a storage device.

14. The method of claim 13, where the store diagnostic process comprises:
- re-executing the swap instruction when an error is not detected.

15. An apparatus for detecting and reducing silent data corruptions, the apparatus comprising: at least one processor configured to:

- perform a store instruction checking operation, wherein the store instruction checking operation comprises instructions to reload a value of a store instruction into a value register as a checking load instruction, and compare the checking load instruction with the store instruction;
- perform a load instruction duplication operation, wherein the load instruction duplication operation comprises instructions to duplicate a load instruction from a load store queue;
- perform a compare instruction and branch instruction duplication operation, wherein the compare instruction and branch instruction duplication operation comprises instructions to duplicate a compare instruction, save the compare instruction as a value in a compare destination register and a value in a compare check register, duplicate a branch instruction, and conditionally invert the value of the compare destination register based on a direction of the branch instruction and the duplicate of the branch instruction;
- perform a branch direction checking operation, wherein the branch direction checking operation comprises instructions to check a basic destination block by comparing one or more static signatures;
- perform a register file checking operation, wherein the register file checking operation comprises instructions to compare a value in a shadow register with a master register after a store instruction; and
- in response to determining an inconsistency during execution of the instructions, transfer execution to a separate diagnostic block to correct any error or inconsistency.

* * * * *